Patented Mar. 2, 1943

2,312,346

UNITED STATES PATENT OFFICE 2,312,346

METHOD OF PRODUCING FAST DYED PATTERNED PARCHMENTIZED FABRICS

Fritz Lorenz and Ernst Weiss, Wattwil, Switzerland, assignors to Heberlein Patent Corporation, New York, N. Y., a corporation of New York No Drawing. Application June 22, 1939, Serial No. 280,518. In Germany July 1, 1938

3 Claims. (Cl. 8—62)

This invention relates to processes by means of which patterned finishing effects, such as are obtainable by the local action of parchmentizing or shrinking swelling agents on cellulose-containing textile fabrics, may be simultaneously fast-dyed. The invention further relates to the improved patterned fabrics which may be made by such processes.

The production of fast dyed patterned swelling effects, in special transparent forms, has heretofore been attempted on textile fabrics. That is, it has been proposed that water-insoluble vat dyestuffs or azo dyestuffs of the naphthol AS series, be dissolved in concentrated anhydrous sulphuric acid, and subsequently diluted for use, for example, with phenol sulphonic acid, in connection with which the dyestuff remains dissolved. However, it has been found that such an acid mixture does not result in satisfactory transparent effects, while on the other hand a suitable transparentizing acid of 54–56° Bé. if used, proves to be a poor and ineffective or practically useless solvent for the water-insoluble vat dyestuffs and the azo dyestuffs of the naphthol series. Furthermore, transparentizing acid or the above mentioned mixture of dyestuff-sulphuric acid-sulphonic acid, are not suitable for direct printing, but only for the production of patterns protected by resists in the transparentizing bath.

As distinguished from the above mentioned proposals, the present invention provides technically useful and practical processes making it possible without using resists or resist discharges, to easily and inexpensively produce dyed shrunk patterns, damask patterns, parchmentized and/or transparentized patterns which are fast to light and capable of withstanding repeated washing or laundering. With this invention the transparentized patterns are exceptionally effective.

Various other features, objects and advantages of the invention will be apparent from the following detailed description and the invention resides in the novel processes, fabrics, and features of the character hereinafter described and claimed.

In accordance with this invention the above indicated problem may be solved by dissolving or distributing colloidally in the printing paste containing the swelling agent either insoluble vat dyestuffs or their leuco esters, or insoluble azo dyestuffs of the naphthol series or the stabilized components of such azo dyestuffs, and in such process the dyeing may be effected either directly during the swelling action or immediately thereafter by a customary developing process.

The unforeseen discovery has been made, in accordance with an important aspect of this invention that it is possible to dissolve insoluble indigoid and anthraquinoid vat dyestuffs and azo dyestuffs of the naphthol series in salt-like parchmentizing swelling agents as for instance concentrated solutions of zinc chloride or calcium rhodanide (sulphocyanate). As disclosed in U. S. A. Patents Nos. 2,112,895 and 2,099,782 these swelling agents may be worked especially well into stable printing pastes and it has been found that the dyestuffs in question may also be dissolved or colloidally distributed in these printing pastes. Exceptionally beautiful and fast dyed transparent patterns are obtained in this manner with the zinc chloride printing pastes (which are preferred as compared with the calcium sulphocyanate), for example, on mercerized voile or mousseline, while on more compact fabrics such for example as warp satin or calico, fast dyed damask-like and more or less dull effects may be obtained.

Also in cuprammonium solutions and cuprammonium cellulose solutions the water insoluble vat dyestuffs or naphthol dyestuffs respectively may be brought into solution or may be colloidally distributed, i. e., therefore likewise in the form of transparentizing or parchmentizing pastes analogous to the case of zinc chloride.

Accordingly in these ways, in one operation there may be produced fast-dyed pattern effects which at the same time may be transparent or damask effects. If the cuprammonium solution contains a large percentage of cellulose, also very beautiful glossy damask effects may be obtained through calendering, and these effects at the same time may be fast dyed.

The said dyestuffs may also be dissolved without difficulty in strong quaternary organic bases, for instance, dimethyl dibenzyl ammonium hydroxide, or in pastes which may be used for printing and which contain such cellulose-dissolved quaternary bases. Similar behavior is shown also by the tertiary amino oxides, for instance dimethyl cyclo hexyl amino oxide, which likewise have cellulose dissolving properties. In both cases one may obtain fast dyed parchmentized pattern effects, for instance, highly lustrous or dull damask effects, and also transparent effects.

Finally also fast-dyed patterned shrunk effects may be produced in one operation if one prints the water insoluble dyestuffs dissolved in strongly alkaline printing pastes, on the fabric and if one leaves the printed fabrics while still moist for a few minutes in loose condition, thereupon washing same out and drying instead of drying same immediately after printing. If one prints in this manner fabrics of regenerated cellulose, for instance viscose rayon or cell wool mousseline, and selects lye concentrations which have a parchmentizing action on such material, as for instance, sodium hydroxide (NaOH), of 18° Bé., one obtains in a like manner fast-dyed patterned parchmentized effects.

Of the insoluble vat dyestuffs, most of the paste prints and powder prints are exceptionally suitable for this process, especially when used together with the zinc chloride printing pastes. Of the suitable indigoid vat dyestuffs the following may be mentioned:

Ciba Blue 2B Micro powder (Schultz 1931, No. 1314).
Brilliant Indigo BASF paste (Schultz 1931, No. 1317).
Helindon Pink BN paste (Schultz 1931, No. 1353).
Ciba Red 3BN dp. paste (Schultz Erg. Bd. I, 1934, No. 1345).
Helindon Red BN powder.

Of the suitable anthraquinoid vat dyestuffs the following may be mentioned:

Cibanon Dark Blue BO dp. paste (Schultz 1931, No. 1262).
Algol Yellow GC paste (Schultz 1931, No. 1249).
Cibanon Yellow GK paste.
Algol Scarlet GGR paste (Schultz 1931, No. 1352).
Indanthrene Yellow GK paste (Schultz 1931, No. 1220).
Indanthrene Brilliant Green B. (Schultz 1931, No. 1269).
Cibanon Red 4B powder.
Indigosol Blue JBC.

Of the insoluble azo dyestuffs of the naphthol series, the following may be mentioned:

Naphthol AS-O4 developed with diazotized Fast Blue BB.
Naphthol AS developed with diazotized Fast Scarlet G.
Naphthol AS-TR developed with Fast Red Salt TR Rapidogen Red R.

The dyeing process itself may be effected for instance in a manner such that the dissolved or colloidally dispersed dyestuff penetrates the fiber during the swelling process, and so that during the decrease of the swelling it is precipitated in an insoluble manner and locked by the fiber after it is no longer swollen. As proof of the fineness of the dispersion of the vat dyestuffs, it may be mentioned that for instance by subsequent treatment of the so-treated fiber with reducing agents and reoxidation, the shades in many cases are changed only very slightly.

In other cases where the dispersion of the vat dyestuffs is not so great, the subsequent padding with alkaline rongalite solution, steaming and reoxidation in accordance with the customary processes, for instance in the air by means of hydrogen peroxide ($H_2O_2$) or bichromate sulphuric acid solutions, causes the shade to be deepened and to become purer. In this way one is able to use less finely dispersed dyestuffs or if necessary to subsequently correct any errors made.

It has furthermore been found that one may vary the described operating methods in the various cases, depending on the swelling agent used. Thus, for instance, in the place of the insoluble vat dyestuffs in printing pastes which contain zinc chloride or a strong inorganic or organic base, one may also distribute the leuco esters of the vat dyestuffs, the so-called indigo sols, colloidally if necessary together with an oxidizing agent such as sodium nitrite ($NaNO_2$), and develop the color after swelling by acidifying for instance in a bath of dilute sulphuric acid. One may, however, also print on the leuco ester with a swelling agent alone and develop in a bath which contains the necessary oxidizing agent, for instance, sodium nitrite in a weak sulphuric acid solution.

As another variant, in the place of the insoluble azo dyestuffs of the naphthol AS series, the undeveloped stabilized components of such azo dyestuffs of the naphthol AS series may be printed on together with the swelling agent.

Thus for instance the stable diazonium compounds (diazotates), the so-called color salts, may be printed together with the zinc chloride printing masses on the material which has been previously treated with naphthol. The dyestuffs in this connection develop after swelling in an entirely normal manner in cold water or in hot soda solution. In the case of printing masses containing cuprammonium, these color salts may even be worked together with the naphthol in the printing mass, in connection with which the developing into azo dyestuffs may take place in the mass. The azo dyestuff in such case remains in the mass in colloidal distribution and gives an excellent finish dyeing upon printing.

Also the nitrosamines plus naphthol, the so-called rapid fast dyes, may be printed together with basic swelling agents, as may likewise the amino azo compounds plus naphthol, the so-called rapidogen dyestuffs, with which very attractive effects can be obtained especially with cuprammonium-containing swelling agents.

Various important advantages of the invention will now be apparent. Many of the novel effects cannot be practically obtained at all in any other technical manner. For instance, anthraquinoid vat dyestuffs which cannot be used in the usual discharge process can be employed in the present process. On the other hand, if more than one color is to be applied to a fabric and a swelling effect is to be carried on in connection therewith, the present process is capable of producing such effects. The present process, accordingly, avoids the roundabout methods of using a discharge which acts as a resist against the swelling agent employed. Also the process itself offers technologically important advantages—for instance, the progressive combining of the steps for obtaining two independent effects (swelling and dyeing) in one operation or in the smallest possible number of operations, the saving in chemicals by the elimination of reduction in connection with vat dyestuffs, the saving in dyestuffs in general and furthermore the novelty and beauty of the effects obtained.

The new process may be used to special advantage wherever swelling effects are applied with parchmentizing agents or with shrinking swelling agents during the finishing, for instance in combination with the process in accordance with the disclosures of the following patents, reference to which is hereby made: U. S. A. No. 2,085,946, 1,998,576, 2,075,695, and 2,087,226.

The following are specific embodiments of the invention but these examples are not to be considered as limitations of the invention except as indicated in the appended claims.

1. 69.5 grams of zinc chloride technically pure in powder form (47-48% $ZnCl_2$ content) are dissolved in 30.5 grams of water, and 1.8 grams of viscose rayon waste is allowed to swell in the solution.

After sufficient swelling the mass is heated to 70° C. until the viscose is dissolved, whereupon it is left to cool. Then 2 grams of Cibanon Red 4B powder are well ground with 5 grams of zinc chloride (technically pure) in powder form and made into a paste with 92 grams of the above specified zinc chloride cellulose paste and well ground.

The dye-containing zinc chloride printing paste is printed at 25° C. on a mercerized mousseline fabric, dried at 100° C., rinsed in cold water and dried under tension. One obtains a fast red dyed transparent pattern.

1a. By subsequent immersion of the fabric obtained in accordance with Example 1, in an NaOH solution of 30° Bé. at 17° C. in loose condition for 3 minutes, crepon effects are obtained in connection with which the unshrunk transparent-like areas remain dyed fast.

2. 5 grams of Algol Scarlet GGR paste are well ground with 10 grams of zinc chloride (technically pure) in powder form, and stirred into a paste with 85 grams of the zinc chloride cellulose solution prepared in accordance with Example 1 and well ground.

The paste is printed on a warp sateen or calico fabric and further treated as under Example 1. One may thus obtain dull fast dyed damask-like patterns.

3. In 100 grams of an aqueous solution of zinc chloride prepared in accordance with Example 1, there are dissolved 1.8 grams of acetate rayon waste and 6 gram viscose rayon waste. Then the solution is heated to 70° C. and again cooled. 3 grams of powdered developed color of the combination naphthol AS' fast diazotized Scarlet G, and 5 grams of zinc chloride (technically pure) in powder form, are carefully ground together and formed into a paste, with 92 grams of the aforedescribed zinc chloride cellulose paste and well ground.

Viscose rayon fabric is printed with this paste, dried at 100° C., cold rinsed and dried under slight tension. Very attractive colored transparent effects may be thus obtained on rayon.

4. In 200 grams of a cuprammonium solution containing about 30 grams of copper per liter, 6 grams of cotton are dissolved to form a printable paste. 6 grams of Ciba Blue 2B Micro powder are carefully ground with small quantities of the said cuprammonium cellulose solution and thereupon thoroughly mixed into a paste with the remaining solution and further ground. A mercerized mousseline fabric is printed with the thus prepared colored cuprammonium printing paste, dried, acidified with $H_2SO_4$ of 2° Bé., washed and mercerized while moist under tension with NaOH of 30° Bé. for about 15 seconds. The caustic is removed with hot water and the article acidified, washed, rinsed and dried under tension. One obtains in this way fast dyed transparent-like effects on mousseline. Voile may be substituted in this example for mousseline.

5. If one uses, in accordance with Example 4, a cellulose-cuprammonium solution with a cellulose content of 4% and more, one obtains fast dyed high gloss silk-like pattern effects. Further variants may be obtained by also subjecting the fabric to the various processes disclosed in the group of prior patents last mentioned above.

6. 3 grams of Cibanon Red 4B powder are made, in small portions, into a paste with a 30% aqueous solution of trimethyl benzyl ammonium hydroxide containing 4% cotton linters in solution, and thereupon the paste is thoroughly stirred into a further quantity of said solution to make a printing paste. The printing is done on cotton-sateen, then the printed article is dried in the air, passed through a sulphuric acid ($H_2SO_4$) solution of 2° Bé., rinsed, dried and calendered.

In this way one obtains a fast dyed, permanent damask-like pattern. By increasing the concentration of the organic base or also with a lesser quantity of dissolved cellulose, fast dyed, transparent-like effects may be obtained when printing on voile or mousseline fabrics.

7. 6 grams of Ciba Red 3 BN dp. paste are carefully mixed to form a paste with 100 grams of NaOH of 38° Bé., and thereupon the solution is thickened with 25 grams of British gum (dextrin) into a printable paste.

With this mass a stripe-pattern is printed on calico, the article is set aside in loose and still moist condition for 7 minutes, then it is washed out, acidified, rinsed and dried. In this way fast-dyed shrunk effects are obtained. On rayon fabrics, fast dyed transparent patterns are obtained in this manner using a shorter time of reaction.

8. 4 grams of Indigo Sol Blue JBC are thoroughly formed into a paste with 4 grams of water, and thereupon 92 grams of a zinc chloride printing paste, in accordance with Example 1, are added and the mixture is ground.

With this mass, mercerized mousseline is printed, dried at 100° C., and developed in

| | | |
|---|---|---|
| Water | grams | 1000 |
| Sodium nitrite | do | 2 |
| Sodium sulphate crystals | do | 20 |
| Concentrated sulphuric acid | cc | 20 | by passing the printed mousseline therethrough at 30° C. for a short time. Then the printed fabric is rinsed, tentered and dried.

9. The following materials are thoroughly ground together:

| | | |
|---|---|---|
| Zinc chloride printing mass in accordance with Example 1 | grams | 92 |
| Indigo Sol Blue JBC | do | 4.0 |
| Water | do | 3.6 |
| $NaNO_2$ | do | 0.4 |

Mercerized mousseline is printed as explained under Example 8, dried at 100° C. and developed.

(a) By washing with cold water, or (b) By treatment with a solution of 20 grams of sodium sulphate crystals plus 20 cc. $H_2SO_4$ per liter of water, rinsing, tentering and drying.

10. An alkaline paste is produced by thickening 100 grams NaOH solution of 38° Bé. with 25 grams British gum (dextrin) and 92 grams of this paste are worked together with 4 grams Indigo Sol Blue JBC and 4 grams water as mentioned under Example 8.

A calico fabric is printed and set aside for 5 minutes and developed warm at 30-35° C. in a solution of 2 grams $NaNO_2$ and 20 cc. $H_2SO_4$ per liter of water. In this way one obtains a fast dyed, shrunk effect of a deep shade.

11. 92 grams of the alkaline paste (thickening) referred to under Example 10, 4 grams Indigo Sol Blue JBC, 0.4 gram NaNO₂, and 3.6 cc. water are stirred together to make a printing paste and a cotton warp sateen is printed therewith. The moist fabric is then set aside for 5 minutes and developed at 30–35° C. in a solution of 20 cc. H₂SO₄ per liter, then rinsed and dried under slight tensioning. The effects obtainable are similar to those mentioned under Example 10.

12. 5 grams Fast Red Salt TR are made into a paste with 10 cc. water of 40° C., and well ground with 25 grams zinc chloride (technically pure) in powder form and then slowly mixed with 60 grams of the zinc chloride printing mass, in accordance with Example 1.

This mass is then printed on mercerized mousseline which has been previously prepared in a well known manner with naphthol AS-TR. The printed fabric is dried at 100° C., and developed either (a) With cold water, or
(b) With a solution of 5 grams soda per liter at 70–75° C., then rinsed, acidified with 10 cc. H₂SO₄ per liter, washed and dried.

13. Dissolve 1.5 grams naphthol AS-TR warm in 3 cc. NaOH of 38° Bé. Then dissolve separately 5 grams Fast Red Salt TR in 25 grams water of 40° C.

First of all the naphthol solution is slowly stirred into 70 grams of a cuprammonium cellulose solution prepared in accordance with Example 4, and thereupon the Fast Red Salt TR solution is added. After the settling of the foam produced, the mass is ready for printing. The printing is done on a mercerized voile, dried, and subsequently the precipitation is effected by acidifying with sulphuric acid of 2° Bé., or it is set aside for a minute and then precipitated moist in accordance with the treatment of Example 4.

14. 6 grams of Rapidogen Red G are dissolved hot with 3 cc. NaOH 38° Bé., 15 cc. water 2 cc. Turkey red oil, and well mixed with 74 grams of the alkaline paste of gum and NaOH (thickening) prepared in accordance with Example 10.

The printing is done on a calico fabric, which is then set aside for 5 minutes and acidified for about ½ minute at 85° C. with 20 cc. of 80% acetic acid plus 5 cc. formic acid and 25 grams Glauber salt in crystals per liter of water. The printed fabric is then rinsed and dried under slight tensioning.

A fast-dyed shrunk pattern is obtained.

15. Dissolve while hot 6 grams Rapidogen Red G, 3 cc. NaOH 38° Bé., 15 cc. water, 2 cc. Turkey red oil, and mix with 74 grams cuprammonium cellulose solution as prepared in accordance with Example 4, then print a mercerized mousseline fabric with this paste and dry. Thereupon continue the treatment after drying as stated under Example 13.

A fast bright deep red is obtained at the areas treated with the cuprammonium.

While the invention has been described in detail with respect to particular preferred examples, it will be understood by those skilled in the art after understanding the invention that various changes and further modifications may be made without departing from the spirit and scope of the invention and it is intended therefore in the appended claims to cover all such changes and modifications.

What is claimed as new and desired to be secured by Letters Patent is:

1. A process for the production in cellulosic textile fabrics, of locally colored pattern areas which are fast-dyed and which embody permanent parchmentized effects, said process comprising: pattern printing the fabric with a paste containing a parchmentizing swelling agent in solution and a water-insoluble dyestuff dispersed therein by the action of said agent, said swelling agent being present in such concentration as to impart permanent parchmentized effects to the fabric, and said dyestuff being selected from the group consisting of water-insoluble vat dyes and water-insoluble azo dyestuffs of the naphthol series; allowing said paste to remain on the fabric until a desired permanent parchmentization has been effected and the dyestuff has penetrated the fiber; and thereafter subjecting the fabric to treatment for removing said agent.

2. A process for the production in cellulosic textile fabrics, of locally colored pattern areas which are fast-dyed and parchmentized, said process comprising: pattern printing the fabric with a paste containing a swelling agent having a dyestuff dispersed therein by the action of said agent, said swelling agent comprising a solution of zinc chloride in sufficient concentration to parchmentize the fabric, and said dyestuff being selected from the group consisting of water-insoluble vat dyes and their leuco esters and water-insoluble azo dyestuffs of the naphthol series and their stabilized components; allowing said paste to remain on the fabric until a desired parchmentization has been effected and the dyestuff has penetrated the fiber; and thereafter subjecting the fabric to treatment for removing said agent.

3. A process for the production in cellulosic textile fabrics, of locally colored pattern areas which are fast-dyed and parchmentized, said process comprising: pattern printing the fabric with a paste containing a swelling agent having a water-insoluble dyestuff dispersed therein by the action of said agent, said swelling agent comprising a solution of zinc chloride in sufficient concentration to parchmentize the fabric, and said dyestuff being selected from the group consisting of water-insoluble vat dyes and their leuco esters and water-insoluble azo dyestuffs of the naphthol series and their stabilized components; allowing said paste to remain on the fabric while drying at elevated temperature of about 100° C. until a desired parchmentization has been effected and the dyestuff has penetrated the fiber; and thereafter subjecting the fabric to treatment for removing said agent.

FRITZ LORENZ.
ERNST WEISS.